United States Patent [19]

Kiri et al.

[11] Patent Number: 5,148,030
[45] Date of Patent: Sep. 15, 1992

[54] RADIATION IMAGE DETECTING APPARATUS USING ADDRESS CODED SIGNALS

[75] Inventors: Motosada Kiri, Kyoto; Susumu Adachi, Ibaraki, both of Japan

[73] Assignee: Shimadzu Corporation, Kyoto, Japan

[21] Appl. No.: 692,418

[22] Filed: Apr. 29, 1991

[30] Foreign Application Priority Data

Apr. 27, 1990 [JP] Japan .................................. 2-113448

[51] Int. Cl.⁵ ............................................. G01T 23/02
[52] U.S. Cl. .......................... 250/370.09; 250/370.08; 250/370.06; 358/111
[58] Field of Search ....................... 250/370.09, 370.08, 250/370.02, 208.1, 208.2, 208.3, 208.4, 208.5, 370.06; 358/111

[56] References Cited

U.S. PATENT DOCUMENTS

| | | | |
|---|---|---|---|
| 4,523,101 | 6/1985 | Tsunekawa | 250/208.2 |
| 4,633,075 | 12/1986 | Sakai et al. | 250/208.1 |
| 4,684,982 | 8/1987 | Krufka | 250/208.3 |
| 4,806,747 | 2/1989 | Dunavan et al. | 250/208.2 |
| 4,879,464 | 11/1989 | Iinuma | 250/370.10 |
| 5,012,082 | 4/1991 | Watanabe | 250/208.2 |
| 5,023,455 | 6/1991 | Vanstraelen | 250/370.09 |
| 5,055,668 | 10/1991 | French | 250/208.2 |

*Primary Examiner*—Carolyn E. Fields
*Assistant Examiner*—Drew A. Dunn
*Attorney, Agent, or Firm*—Armstrong & Kubovcik

[57] ABSTRACT

A photon counting type radiation image detecting apparatus, improved so as to reduce the number of lead wires from many pixel-forming arrayed radiation detectors to an image display device. This is accomplished by coding the output signal from the detectors with respect to their locations. Level determining circuits are used to determine the detection and level of photon energy.

2 Claims, 2 Drawing Sheets

RADIATION IMAGE DETECTING APPARATUS USING ADDRESS CODED SIGNALS

BACKGROUND OF THE INVENTION

The present invention relates to an apparatus for detecting a radiation image with the image divided into pixels.

Such an apparatus, often employing a method of photon counting, has its image receiving component made up of a one-dimensional or two-dimensional array of many pixel-forming radiation detectors. The one-dimensional array of detectors is made to scan an image-forming plane on which is formed a radiation image to be detected, while the two-dimensional array of detectors is held, as a stationary image-receiving plate, at the image-forming plane. In any case the detectors, receiving radiation photons, output pulsed electric signals, which are signal-processed and then supplied to a CRT to visibly display a detected radiation image.

The radiation image detecting apparatus of this type has its pixel-forming radiation detectors disadvantageously accompanied by their respective long signal-transmission circuits leading from the detectors to the final display stage (CRT), the circuits containing therein signal processing electronic devices. The number of these long signal-transmission circuits is often very large corresponding to the number of the detectors. A large number of such signal transmission circuits cause the apparatus to be complex and apt to suffer such troubles as wire breaking and short-circuit formation.

OBJECTS AND SUMMARY OF THE INVENTION

The present invention aims at solving the above mentioned disadvantages involved in the conventional photon counting type radiation image detecting apparatus, and makes it an object to provide an improved photon counting type radiation image detecting apparatus in which the number of signal lead-out wires from arrayed radiation detectors is made much smaller than that of the detectors.

Another object of the present invention is to constitute such an improved radiation image detecting apparatus so that the pixel signal from each of the arrayed detectors is identified, with respect to its location and level, by a combination of a coded address signal with a level indication signal.

To achieve the above objects the apparatus according to the present invention comprises signal coding circuits for coding the output signals from the arrayed radiation detectors with respect to the detector locations. Suppose, for instance, that the pixel locations in a detector array having 64 pixel-forming detectors are addressed by binary-coded signals, the number of lead wires for pixel location determining signals is reduced to 6 according to the relation of $2^6=64$. Therefore, even if detected radiation energy is discriminated two-stepwise, the total number of signal take-out wires remains eight.

As is indicated from the above example, the present invention makes it possible to take out through a small number of lead wires the pixel signals outputted from very many pixel-forming detectors arrayed one- or two-dimensionally to constitute the radiation image receiving component of a radiation image detecting apparatus, not only causing the apparatus to be manufactured and assembled very easily, but also reducing such troubles as wire breaking and short-circuit formation. This merit becomes more remarkable with an increase in the number of detectors.

BRIEF DESCRIPTION OF THE DRAWINGS

The present invention is described in further detail in the following on reference to the accompanying drawings in which.

DETAILED DESCRIPTION OF THE INVENTION

Figure 1:
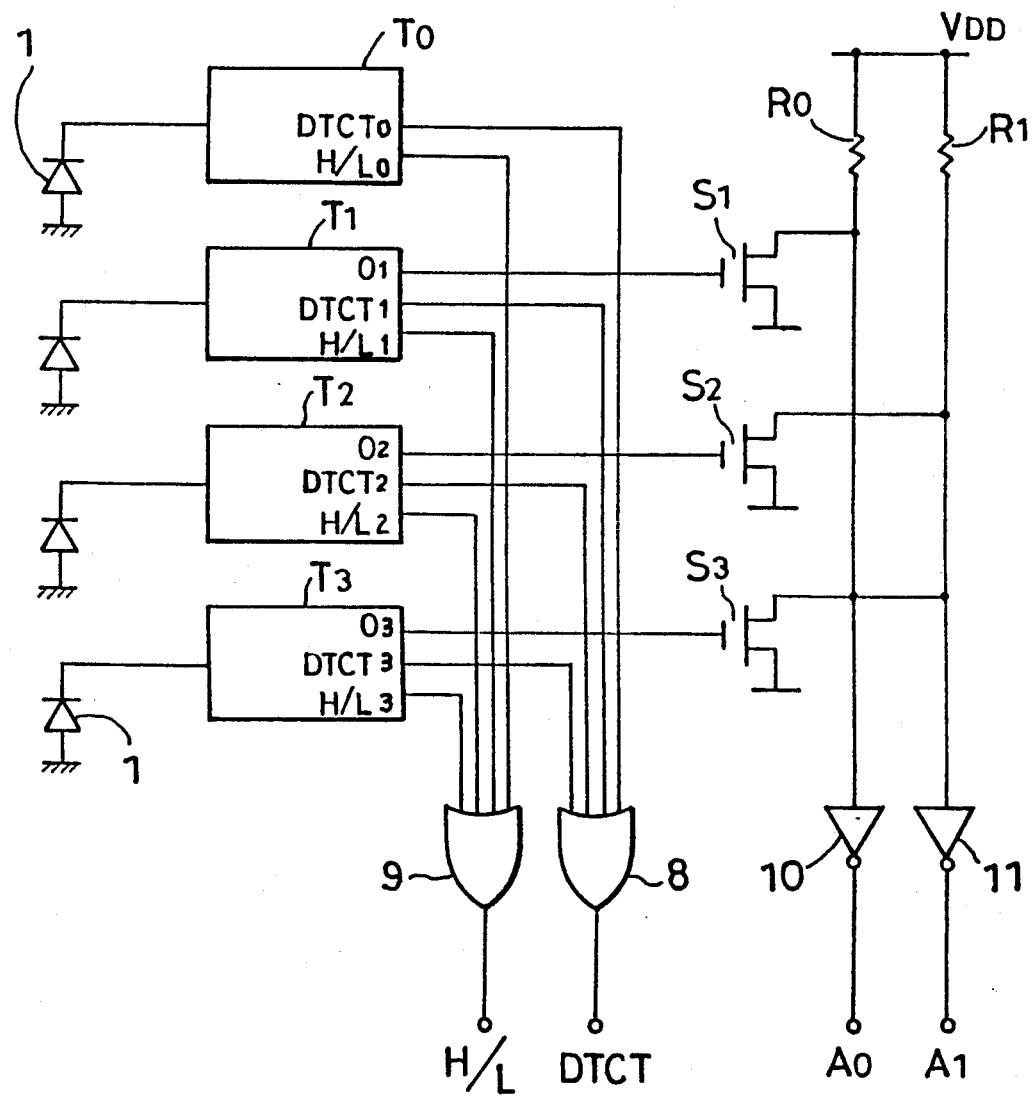
FIG. 1 shows a block diagram of a circuit constitution of an embodiment of the present invention.
Figure 2:
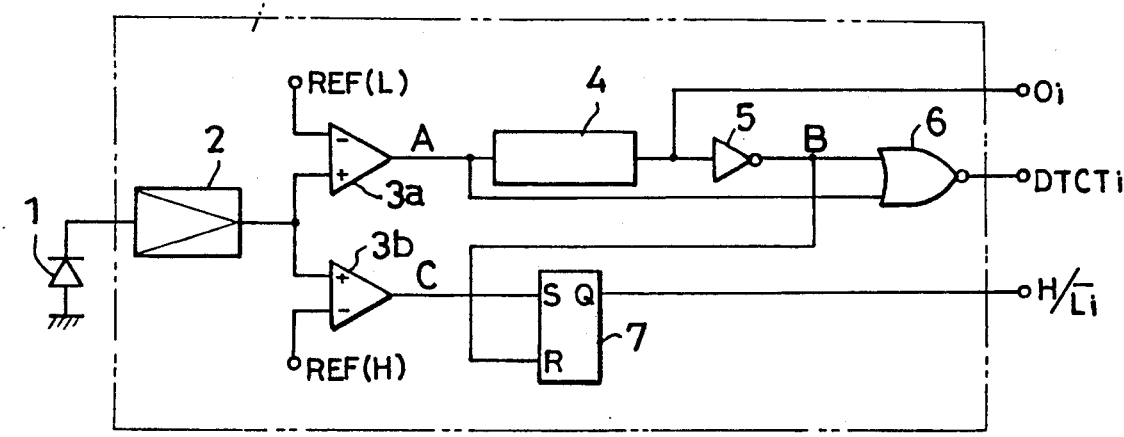
FIG. 2 shows one of coding signal producing circuits used in the circuit shown in FIG. 1.

Referring to FIG. 1, an embodiment of the invention is shown, for the simplicity of description, as a radiation image detecting apparatus having only four pixel-forming radiation detectors 1. The detectors 1 have their output first inputted to their respective coding signal producing circuits $T_i$ (i=0, 1, 2, 3), whose constitution is shown in FIG. 2. These circuits $T_i$, as is described later on reference to FIGS. 2 and 3, output their respective three kinds of signals $O_i$, $DTCT_i$ and $H/L_i$, through $O_o$ is left unused.

The signals $O_i$ (i≠0) are to operate three switching elements $S_i$ (i=1, 2, 3), which switch on and off a constant DC voltage $V_{DD}$ to be inputted to two inverters 10 and 11. The inverters 10 and 11 have their respective outputs $A_o$ and $A_1$ turned to 1 (high level) or 0 (low level) by the signals $O_i$ (i≠0). Various combinations of outputs $A_o$ and $A_1$ are used, as described later, as address code signals identifying photon-irradiated one of the detectors 1. On the other hand the signals $DTCT_i$ and $H/L_i$ outputted from the circuits $T_i$ (i=0, 1, 2, 3) are respectively inputted to OR gates 8 and 9, which give, as described later, a radiation detection signal and a detected-radiation level discrimination signal, respectively.

In the following is described the constitution of the circuit $T_i$ according to FIG. 2. A pulse signal outputted from one pixel-forming radiation detector 1 irradiated with a photon is amplified by an amplifier 2 and then inputted to both a low-level comparator 3a and a high-level comparator 3b. They compare the output of the amplifier 2 with a low-level reference signal L and with a high-level reference signal H, respectively. The output of the low-level comparator 3a is inputted, through a delay circuit 4, to an inverter 5. The output of the delay circuit 4 gives the previously mentioned signal $O_i$, while the output A of the low-level comparator 3a is inputted also to a NOR gate 6 together with the output B of the inverter 5 to make the NOR gate 6 output the signal $DTCT_i$. On the other hand the high-level comparator 3b has its output C supplied to the SET terminal of a R-S flip-flop 7, whose RESET terminal is connected to the output side of the inverter 5. The flip-flop 7 thus outputs the signal $H/L_j$.

Figure 3:
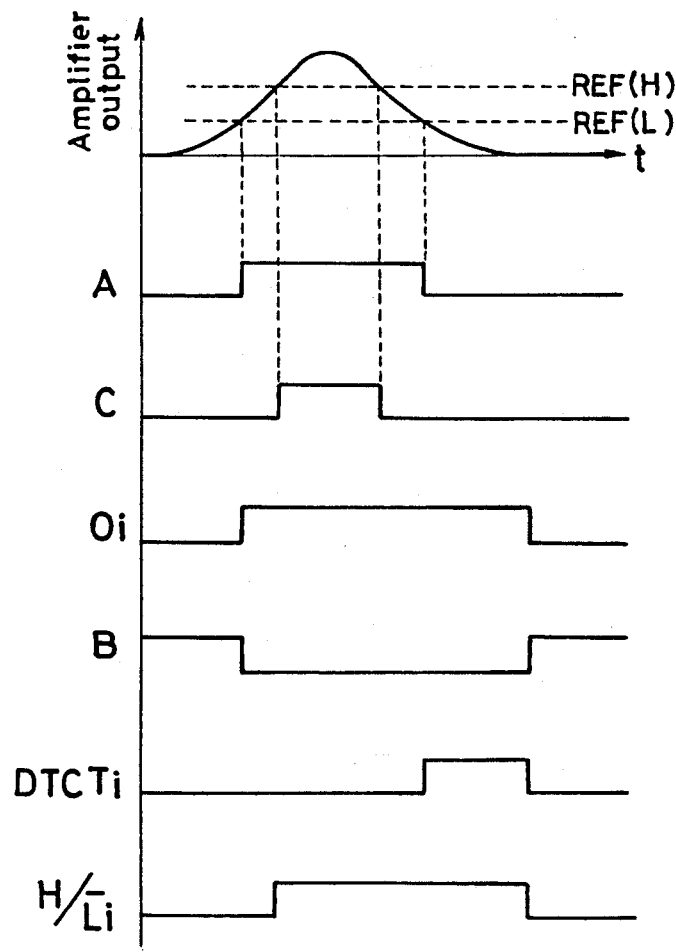
FIG. 3 shows the signals at various points of the circuits shown in FIGS. 1 and 2.

Then the function of the circuit $T_i$ is described on reference to FIG. 3. Supposing that the output signal from the photon-irradiated detector 1 (therefore, from the amplifier 2) shows a wave form like the curve as shown uppermost in FIG. 3, the two comparators 3a and 3b respectively output signal A and C, as illustrated in FIG. 3. The output A is prolonged to a predetermined longer time period by the delay circuit 4 to give the signal $O_i$ as illustrated in FIG. 3. The signal $DTCT_i$ outputted from the NOR gate 6, to which are inputted, as mentioned above, the outputs A and B of the comparator 3a and the inverter 5, rises up at the fall-down edge of the signal A and falls down at the rise-up edge of the signal B. On the other hand the signal $H/L_i$ outputted from the flip-flop 7 is made to rise up when the output signal C from the comparator 3b rises up, and made to fall down when the signal B rises up.

The signals $O_i$ are used as address code making signals. For instance, if all of the signals $O_i$ outputted from the circuits $T_i (i \neq 0)$ are at a low level, both the inverters 10 and 11 (FIG. 1) have their outputs $A_o$ and $A_1$ kept at a low level, giving an address code signal (0, 0) made of the combination of $A_o$ and $A_1$. The address code signal (0, 0) stands for the 0-th channel related to the circuit $T_o$. Further, if the signal $O_1$ outputted from the circuit $T_1$ is at a high level, an address code signal (1, 0) is given standing for the 1st channel related to the circuit $T_1$. In the similar manner address code signals (0, 1) and (1, 1) respectively stand for the 2nd channel related to the circuit $T_2$ and the 3rd channel related to the circuit $T_3$.

On the other hand the signals $DTCT_i$ (refer to FIG. 3) are used as photon detection signals, and the signals $H/L_i$ are used as detected-photon energy discrimination signals. A high-level state of the signals $DTCT_i$ confirms the detection of a photon, while the energy of the detected photon is two-stepwise determined by whether the signals $H/L_i$ are at a high level or a low level. The signal $H/L_i$ show a high-level if the peak of the output from the amplifier 2 exceeds the high-level reference signal H, and remains at a low level if the amplifier output peak remains below the high-level reference signal H. In this manner the detected-photon energy can be determined two-stepwise.

Although the invention is described, for the simplicity of description, with an embodiment having only four pixel-forming radiation detectors, the present invention can of course be applied, without altering or modifying the principle of the above embodiment, to any similar radiation image detecting apparatus having any large number of radiation detectors.

We claim:

1. A radiation image detecting apparatus having a radiation receiving component thereof composed of arrayed pixel-forming radiation detectors, said apparatus comprising:
    a plurality of signal processing circuits;
    a coding circuit for coding pulsed output signals of said radiation detectors with respect to the respect to the position of a radiation detector irradiated with a photon; and
    two OR gates coupled to said signal processing circuits, each of said signal processing circuits comprising:
    an amplifier means coupled to one of said radiation detectors for amplifying the output signals thereof;
    a low level comparator means coupled to an output of said amplifier means for determining a low level output therefrom;
    a high level comparator means coupled to said output of said amplifier means for determining a high level output therefrom, wherein said low level comparator supplies both an address forming signal to said coding circuit and a photo detection signal to one of said two OR gates, while said high level comparator supplies an energy level judging signal to the other of said two OR gates, each OR gate outputting to each radiation detector a common photon detection signal and energy level judging signal.

2. A radiation image detecting apparatus as recited in claim 1, wherein each of said signal processing circuits further comprises:
    delay circuit means coupled to said low level comparator means, for delaying a time period of an output of said low level comparator means,
    flip-flop means coupled to an output of said high level comparator means, for providing an output of said signal processing circuit, and
    inverter means coupled to an output of said delay circuit means, for inverting an output therefrom,
    wherein said delay circuit means delays the low level output and provides a first output signal of said signal processing circuit, said inverter means inverts said output of said delay circuit means, said inverted output being used to determine a second output of said signal processing means, and said flip-flop means provides a third output signal of said signal processing circuit based on input of said high level comparator means and said inverter means.

* * * * *